United States Patent [19]

Cunningham et al.

[11] 4,281,818

[45] Aug. 4, 1981

[54] REPLACEABLE ADJUSTABLE BUTTERFLY VALVE SEAT

[75] Inventors: John P. Cunningham, Narragansett; Dezso Szilagyi, Cranston, both of R.I.

[73] Assignee: General Signal Corporation, Stamford, Conn.

[21] Appl. No.: 154,545

[22] Filed: May 29, 1980

[51] Int. Cl.³ .............................................. F16K 1/22
[52] U.S. Cl. .................................................. 251/307
[58] Field of Search ....................... 251/305, 306, 307

[56] References Cited

U.S. PATENT DOCUMENTS

| | | | |
|---|---|---|---|
| 3,393,697 | 7/1968 | Fawkes | 251/307 |
| 3,583,670 | 6/1971 | Manske | 251/307 |
| 3,726,504 | 4/1973 | Kormos et al. | 251/306 |
| 3,734,457 | 5/1973 | Roos | 251/306 |
| 3,774,880 | 11/1973 | Crookham et al. | 251/307 |
| 3,814,380 | 6/1974 | Kormos et al. | 251/307 |
| 4,006,883 | 2/1977 | Hilsheimer | 251/307 |

FOREIGN PATENT DOCUMENTS 2915889  10/1979  Fed. Rep. of Germany ........... 251/306

*Primary Examiner*—H. Jay Spiegel
*Attorney, Agent, or Firm*—Thomas R. FitzGerald; Jeffrey S. Mednick; Perry Palan

[57] ABSTRACT

This invention concerns a butterfly valve having a resilient, adjustable body seat for the pivoting disc. The seat comprises a T-shaped elastomeric ring which is confined at one end by the transverse wall of an annular groove in the valve body and that another end by a clamping ring which slides along the wall of the flow passage extending through the body. The clamping ring is forced against the seat ring by a plurality of individual screw actuators spaced around its circumference and therefore selected portions of the seat ring can be compressed as needed to produce a leak-free seal around the entire periphery of the pivoting disc. The T-shaped elastomeric ring is held in place solely by mechanical forces in order to permit removal, maintenance, and replacement thereof.

5 Claims, 3 Drawing Figures

REPLACEABLE ADJUSTABLE BUTTERFLY VALVE SEAT

BACKGROUND

In U.S. Pat. No. 3,814,380 there is described an invention for an adjustable seat construction in a butterfly valve. That invention provides an adjustable seat construction which is inexpensive to manufacture, gives uniform pressure between a valve seat and disc, and thus can be operated with minimum torque, and allows replacement of the rubber seat in the field. That valve seat employs rectangular- or trapizoidal-shaped elastomer (e.g. rubber) seats which are either epoxy bonded or vulcanized into a machined recess in the valve body. When the valve seat has to be replaced or repaired, the valve is normally removed from the line, heated up until the bond between the valve seat and body is broken down, the remaining epoxy is chipped away, and then new epoxy or vulcanizing is applied to a new seat in order to bond the seat into the body. Other valves have used T-shaped sealing members. See, for example, U.S. Pat. Nos. 4,006,883; 3,774,880; 3,744,753; 3,583,670; and 3,393,697.

Accordingly, it would be desirable to have an adjustable butterfly valve that retains all of the advantages of the above-identified invention, as well as includes a readily replaceable T-shaped body seat.

SUMMARY

The object of this invention is to provide an improved adjustable seat construction which is inexpensive to manufacture, provides uniform pressure between seat and disc, can be operated with minimum torque, and allows ready replacement of the rubber seat in the field. In the new construction, the seat is in the form of an elastomeric T-shaped ring having a first axially extending portion on one side, a second axially extending portion on the other side, and radially inward extending portion. The T-shaped seat ring is mounted in and fills a continuous annular groove formed in the walls of the valve body passage. The annular groove has a transverse wall and an annular recess in the transverse wall for receiving the first axially extending portion of the seat ring. The radially inwardly extending portion of the seat ring has an inner peripheral surface which serves as a seating surface for the disc and transverse end faces at opposite sides of the seating surface. An endless clamping ring is fitted to slide along the wall of the passage and is formed with an end clamping surface which conforms to and engages one transverse end face of the radially inwardly extending portion. A plurality of individual actuators, such as a series of set screws, are spaced from one another around the circumference of the clamping ring. The actuators press the clamping ring against the seat ring to thereby compress the latter against the transverse wall of the body groove and bulge its seating surface inward against the disc. Each actuator includes a threaded element which reacts between a portion of the clamping ring and a transverse body surface formed either by a continuous groove or by a recess cut in the body. The seat ring cross section is uniform and is free of perforations; the mating surface of the clamping ring is uninterrupted; therefore, selective adjustment of the screw actuators can produce substantially uniform disc-seat contact pressure around the entire circumference of the disc. Moreover, since the various grooves or recesses in the valve body can be formed by turning or milling operations and the threaded elements of the actuators need not be screwed into tapped holes in the body, machining costs are kept to a relatively low level. Since the elastomeric seat ring is mechanically locked into its sealing position, the seat ring can be easily removed and replaced in a relatively short time, without the need for physically removing the butterfly valve from its associated system.

DESCRIPTION OF THE EMBODIMENT OF FIGS. 1 AND 2

Figure 1:
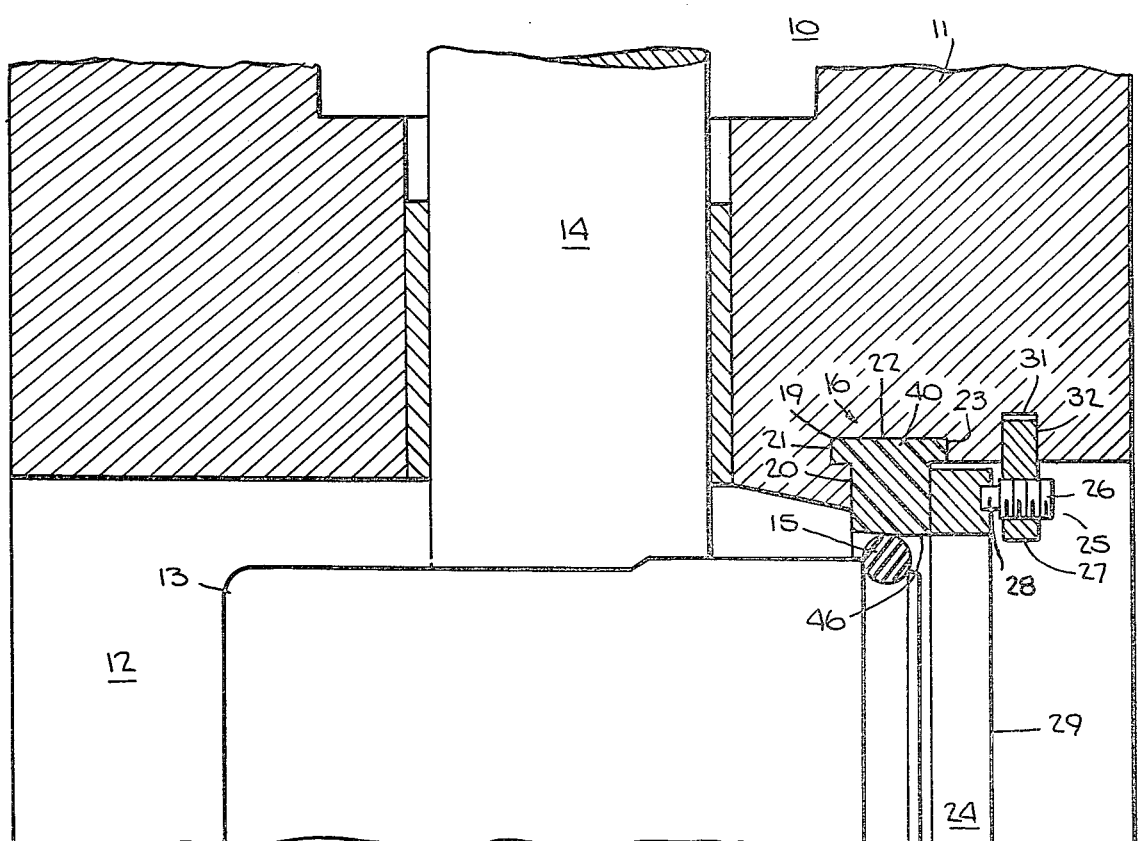
FIG. 1 is a partial axial sectional view of a butterfly valve incorporating one version of the invention.
Figure 2:
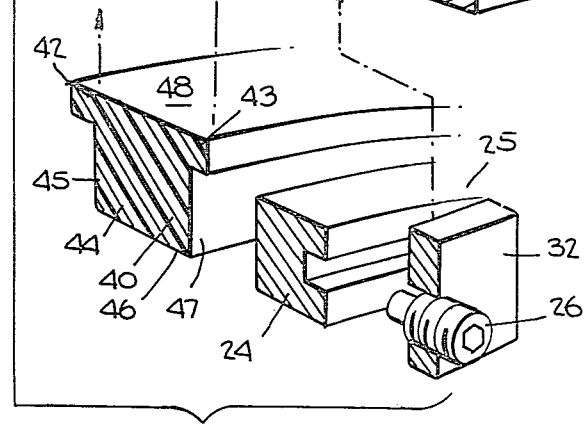
FIG. 2 is a partial exploded perspective view of the valve body, seat ring, clamping ring, and one actuator of the invention.

Referring to FIGS. 1 and 2, the illustrative butterfly valve 10 comprises a cast iron, cylindrical body 11 formed with a through flow passage 12, a circular disc 13 carried by a rotary shaft 14 which is supported by bearings mounted in the body 11. The disc 13, which also is made of cast iron, is provided with a rounded corrosion-resistant valving edge 15 which is adapted to move into and out of sealing engagement with the improved body seat 16 of the present invention. The preferred valving edge 15 is a stainless steel ring which is shrink fitted into a groove in disc 13 in accordance with the teachings in U.S. patent application Ser. No. 130,707 filed Apr. 2, 1971, now U.S. Pat. No. 3,726,504 but other known valving edge designs may be used.

The new seat construction 16 includes a seat ring 40 of T-shaped cross section which is made of rubber or other elastomeric material suitable for the service for which the valve is intended and is provided with a seating surface 46. The seat rings for valves up to 48 inches in diameter are molded in one piece; the seat rings for larger valves are made from several molded pieces which are joined end-to-end by vulcanization. A portion of seat ring 40 is received by and fills an annular groove 19 formed in body 11 and bounded by a transverse wall 20 with an annular recess 21 end wall 22 and transverse wall 23. The seat ring 40 need not be bonded in place with epoxy adhesive, but rather is held in the groove 19 solely by mechanical forces.

The body groove 19 is spaced axially from the disc shaft 14 so that the seat 40 can be an endless ring free of the shaft-encircling portions which increase operating torque, but the groove preferably is located as close as possible to the shaft in order to minimize the thickness of disc 13. This goal is achieved in the illustrated embodiment by using a groove wall 20 which lies in a radial plane. A recess 21 is cut into body 11 underneath wall 20 to form a receiving portion for an axially extending portion of the T-shaped seat ring 40. A cylindrical end wall 22 forms the boundary of recess 21.

With reference to FIG. 2, seat ring 40 has a first axially extending portion 42 on one side, a second axially extending portion 43 on another side, and a radially inwardly extending portion 44. Seat ring 40 is mounted in and fills the groove 19. The first axially extending portion 42 fills the annular recess 21 underneath transverse wall 20. The radially inwardly extending portion 44 has on one side a transverse surface 45 that adjoins transverse wall 20, a peripheral surface 46 serving as a seat for valving edge 15, and on another side a second transverse surface 47 that faces a clamping ring 24. An outer radial peripheral surface 48 adjoins cylindrical end wall 22 and axially extending portion 43 adjoins transverse wall 23.

Clamping ring 24 is dimensioned having an outer diameter less than the inner diameter of passage 12 so as to slide along the cylindrical wall of passage 12 and is urged into contact with seat ring 17 by a series of screw actuators 25 spaced uniformly around its circumference. Each actuator 25 comprises a dog point set screw 26 which is threaded into a clamping block 27 and engages the bottom wall of a continuous groove 28 formed in the end face 29 of clamping ring 24. The clamping blocks 27 are set into straight sided recesses 31 formed in body 11 and react against the surfaces 32 of the recesses when the set screws are turned to form clamping ring 24 against seat ring 40. Clamping ring 24, set screws 26 and blocks 27 should be made of corrosion resistant material, such as stainless steel, in order to permit seat adjustment and replacement in the field even after long periods of service. The number of actuators 25 employed in the valve depends upon valve size and pressure rating. For a typical 20" valve having a pressure rating of 150 p.s.i. (and subjected to a bubble test pressure of 300 p.s.i.), eight actuators 25 employing five-sixteenths inch set screws have proven adequate.

The procedure for adjusting disc-seat interference is as follows:
a. Move the disc 13 to closed position and clamp the valve in a test fixture with its axis vertical and the blocks 27 on the upper side.
b. Turn set screws 26 finger tight.
c. Cover the upper surface of disc 13 with a pool of water.
d. Subject the lower face of disc 13 to air at the required test pressure and note the locations of leaks.
e. Tighten the set screws 26 closest to a leak until it stops, and then stop a leak on the diametrically opposite side of the disc.
f. Repeat step e until all leaks are stopped.
g. Maintain air pressure for 5 minutes and retighten the set screws 26 adjacent any new leaks which develop.

While, in this procedure, pressure is applied to the side of disc 13 opposite body seat 16, it should be understood that this is done solely to facilitate adjustment of actuators 25, and that the valve can be used in service to handle flow in either direction.

In the adjustment process, leaks are stopped, and the required disc-seat interference is produced, as a result of the inward bulging of seating surface 46 which occurs as seat ring 40 is compressed between groove wall 20 and clamping ring 24. This bulging effect is adversely affected by the presence of voids within the cavity defined by walls 20, 22, 23, recess 21 and clamping face 23; therefore, it is important that the molded cross section of ring 40 conform rather closely to the cross sectional shape of this cavity.

DESCRIPTION OF THE FIG. 3 EMBODIMENT

Figure 3:
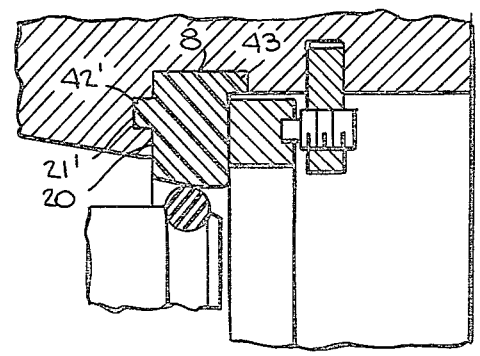
FIG. 3 is a partial axial sectional view of an alternate embodiment of the invention.

In the set construction 16' shown in FIG. 3, the seat ring 40' has axially extending portions 42' and 43' radially spaced from one another. This is in contrast to the embodiment shown in FIGS. 1 and 2 where the axially extending portions 42 and 43 are in axial alignment with each other. Accordingly, the corresponding recess 21' is spaced inwardly from the position shown in FIG. 1. As a result, the set screw 26 is at least in partial direct axial alignment with the first axially extending portion 42' of the seat ring 40'. Hence, the mechanical forces generated by the screw actuator 25 are more directly applied to the axially extending portion 42' of seat ring 40'.

In addition to the embodiment shown in the figures, those skilled in the art will recognize that other screw actuators 25 can be used to achieve the same purpose as the particular screw actuators described in the foregoing specification. In particular, U.S. Pat. No. 3,814,380 describes a cone point set screw type actuator which can be screwed into a tapped radial hole extending through the clamping ring and engaging a wall of a V-shaped annular groove in the valve body. In addition, the screw actuator shown in FIGS. 1 through 3 could be received in an annular body groove rather than in the separate recesses shown and described in the foregoing specification.

Having thus described the subject invention, those skilled in the art will recognize that further modifications and additions may be made to the embodiments described above without departing from the spirit and scope of the following claims.

We claim:
1. In a butterfly valve including a body containing a through flow passage, and a pivoting disc which cooperates with a seat to control flow through the passage, an improved seat arrangement which comprises
   a. a continuous annular groove formed in the wall of said passage and encircling the axis of the passage, said continuous annular groove including an end wall, a first and second transverse walls, said first transverse wall extending into said passage, and an annular recess in said first transverse wall;
   b. an elastomeric seat ring including a first axially extending portion on one side of said seat ring, a second axially extending portion on the other side of said seat ring, and a radially inwardly extending portion, said seat ring mounted in and filling the groove, said radially inwardly extending portion having an inner peripheral surface which serves as a seating surface for the disc and first and second transverse end faces at opposite sides of the seating surface, the first end face conforming to and bearing against said first transverse wall of the groove, said first axially extending portion extending into said annular recess, and said second axially extending portion extending in said groove and engaging said second transverse wall;
   c. an endless clamping ring having a smaller outer diameter than the inner diameter of said passage and formed with a first clamping face which is concentric to said second axially extending portion of said seat ring and a second clamping face which conforms to and engages said second end face of said radially inwardly extending portion of said seat ring;
   d. a plurality of individual actuators spaced from one another in the direction of the circumference of the clamping ring and serving to force the clamping ring axially and thereby compress selected portions of the seat ring between the first transverse groove wall and the second clamping face and produce selective bulging of the seating surface;
   e. each actuator including a screw threaded element which reacts between a portion of the clamping ring and a removable transverse member which extends outward from the wall of said passage into said passage.

2. A butterfly valve as defined in claim 1, wherein said seat ring is substantially T-shaped in cross-section.

3. A butterfly valve as defined in claim 1, wherein said first axially extending portion of said seat ring is at the outer periphery of said seat ring.

4. A butterfly valve as defined in claim 1, wherein said first axially extending portion of said seat ring is spaced from the outer periphery of said seat ring and said annular recess is spaced from said end wall of said annular groove.

5. The butterfly valve as defined in claim 4 wherein said actuators are in substantial axial alignment with said first axially extending portion of said seat ring.

* * * * *